(12) United States Patent
Drapp et al.

(10) Patent No.: US 11,877,353 B2
(45) Date of Patent: *Jan. 16, 2024

(54) MODULAR COMMUNICATION HOUSING UNIT PROVIDING INTEGRATED AND AUTOMATIC FAILOVER TO A SECONDARY MESHED PEER-TO-PEER COMMUNICATION NETWORK

(71) Applicant: Fenix Group, Inc., Chantilly, VA (US)

(72) Inventors: Matthew Drapp, Chantilly, VA (US); Stefan Schaner, Chantilly, VA (US); Michael Wong, Chantilly, VA (US)

(73) Assignee: Fenix Group, Inc., Chantilly, VA (US)

( * ) Notice: Subject to any disclaimer, the term of this patent is extended or adjusted under 35 U.S.C. 154(b) by 22 days.

This patent is subject to a terminal disclaimer.

(21) Appl. No.: 17/399,986

(22) Filed: Aug. 11, 2021

(65) Prior Publication Data

US 2023/0397300 A1    Dec. 7, 2023

Related U.S. Application Data

(63) Continuation of application No. 17/187,598, filed on Feb. 26, 2021.

(51) Int. Cl.
| | |
|---|---|
| *H04L 12/741* | (2013.01) |
| *H04L 29/12* | (2006.01) |
| *H04L 29/08* | (2006.01) |
| *H04L 12/931* | (2013.01) |
| *H01Q 1/38* | (2006.01) |
| *H01Q 1/08* | (2006.01) |
| *H02J 7/02* | (2016.01) |
| *H04W 84/18* | (2009.01) |
| *H04W 88/16* | (2009.01) |

(Continued)

(52) U.S. Cl.
CPC .......... *H04W 84/18* (2013.01); *H04W 24/04* (2013.01); *H04W 40/02* (2013.01); *H04W 84/22* (2013.01); *H04W 88/04* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 2005/0177631 A1* | 8/2005 | Bahl | H04L 41/12 709/224 |
| 2021/0152976 A1* | 5/2021 | Daoura | H04W 52/0229 |

* cited by examiner

*Primary Examiner* — Hong Shao
(74) *Attorney, Agent, or Firm* — Polsinelli PC

(57) ABSTRACT

Disclosed is a self-contained mesh radio extension unit, comprising a receiving sleeve having an open volume and a first data connector for communicative coupling to a communication device or cellular phone inserted in the open volume. A low-gain internal antenna and a high-gain external antenna are coupled to a digital data link (DDL) with a first DDL operating frequency. The DDL provides bidirectional internet protocol (IP) connectivity between the first data connector and a peer-to-peer meshed communication network, controlling one or more of the antennae as transceivers at the first DDL operating frequency. An integrated power supply system powers the DDL and includes a rechargeable internal battery and an external power interface. A control system automatically routes IP packets received or transmitted by the DDL and includes a network address translation (NAT) router and an IP addressing service for assigning and tracking IP addresses across the peer-to-peer meshed communication network.

19 Claims, 4 Drawing Sheets

(51) Int. Cl.
*H04W 24/04* (2009.01)
*H04W 84/22* (2009.01)
*H04W 40/02* (2009.01)
*H04W 88/04* (2009.01)

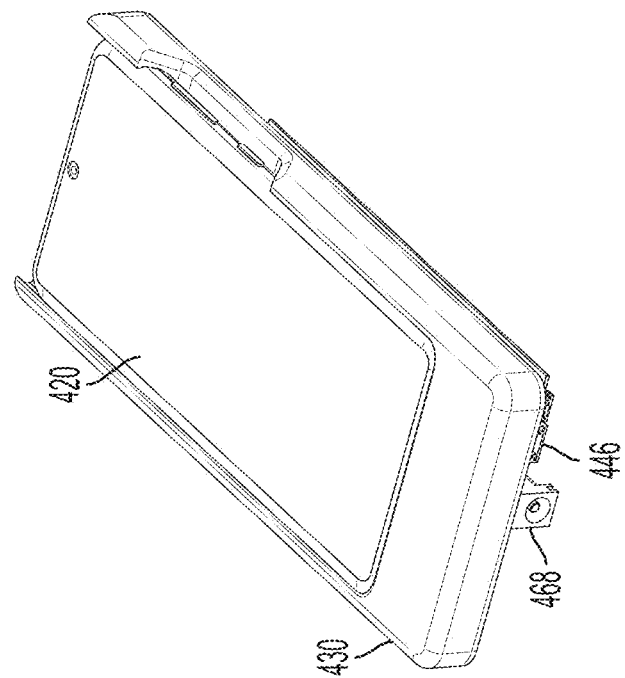
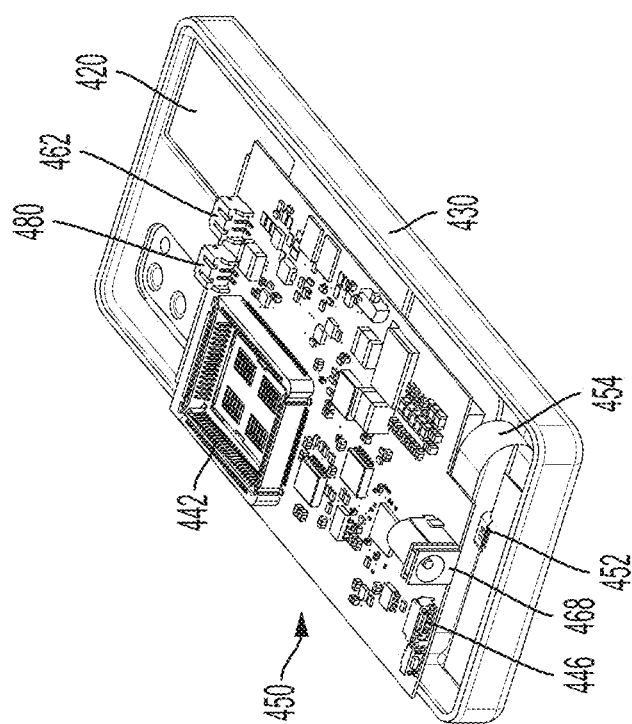
FIG. 4A
FIG. 4B

MODULAR COMMUNICATION HOUSING UNIT PROVIDING INTEGRATED AND AUTOMATIC FAILOVER TO A SECONDARY MESHED PEER-TO-PEER COMMUNICATION NETWORK

CROSS-REFERENCE TO RELATED APPLICATIONS

This application is a continuation of U.S. patent application Ser. No. 17/187,598 filed Feb. 26, 2021 and entitled "MODULAR COMMUNICATION HOUSING UNIT PROVIDING INTEGRATED AND AUTOMATIC FAILOVER TO A SECONDARY MESHED PEER-TO-PEER COMMUNICATION NETWORK" the disclosure of which is herein incorporated by reference in its entirety.

TECHNICAL FIELD

The present disclosure pertains to mobile communications, and more particularly pertains to extending primary communication devices with a detachable, self-contained housing for providing automatic failover from a primary network to a meshed communications network.

BACKGROUND

In an increasingly digital and interconnected age, reliable communications have become a cornerstone upon which many aspects of modern life are built. Although typically considered in the context of everyday usage scenarios, such as at the office or the home, reliable communications are also of tremendous importance in governmental and military contexts, in which failed or unreliable communications are not just a mere inconvenience but can put multiple lives at risk. Somewhat closer to home, reliable communications have proven to be essential in providing emergency services and emergency response—yet to this day, large numbers of natural disasters, humanitarian crises, and other emergency events continue to suffer from a lack of reliable communications. Regardless of the context, in the absence of the ability to communicate and send data, the flow of information grinds to a halt, crippling decision-making and logistical operations during times of crisis or need.

In the context of communications systems that are designed for military or emergency use, or are otherwise designed to be robust against failure, a primary focus is communication availability and reliability at the network edge. Another important design factor is communications redundancy. For example, military personnel operate various forms of different communications equipment in an attempt to ensure that audio and/or data connectivity are maintained in the event of a communications failure at the tactical edge. In light of these two factors (network robustness/edge reliability and communications redundancy), communication systems can be designed to accommodate changing conditions in a network deployment environment by carrying hardware for communication over multiple different networks.

However, conventional systems are cumbersome, bulky, and provide secondary network radios that are low power/low range, low bandwidth, and generally inappropriate for mission critical use cases. Moreover, conventional systems do not seamlessly integrate with a user's existing primary communication device in a convenient form factor, instead requiring users to carry two separate devices while also ensuring that a connection between the devices is not broken or interrupted. Accordingly, it would be desirable to not only provide a more powerful, efficient and secure failover network that can be integrated with user communication devices operating on a primary communication network, but also to integrate the secure failover network into a convenient and compact form factor that can be seamless combined with a user's existing communication device(s).

SUMMARY

Disclosed herein are systems and methods for providing various communication devices with automatic failover from a primary communication network to a meshed communication network, wherein the meshed communication network is provided by a self-contained mesh radio unit detachably coupled to the primary communication device.

The self-contained mesh radio unit can be both communicatively coupled to the primary communication device and/or physically coupled to the primary communication device. In some embodiments, the primary communication device comprises a smartphone and the self-contained mesh radio unit is integrated into a case or housing that receives the smartphone (see, e.g., FIGS. 3A and 3B). In this fashion, the smartphone can be both communicatively coupled (e.g., via its female USB-C or other data port/connector) and physically coupled (e.g., via its own housing) to the self-contained mesh radio unit in an approximately simultaneous fashion, simply by inserting the smartphone into the case portion of the self-contained mesh radio unit's housing.

In other words, aspects of the present disclosure contemplate a housing that not only contains all of the constituent components of the self-contained mesh radio unit but can further be employed as a case or sleeve for receiving the smartphone and communicatively coupling it to the self-contained mesh radio unit. Notably, this provides a seamless and improved user experience in comparison to conventional solutions, which at most permit an external radio (in an entirely separate housing) to be connected to a communication device, therefore requiring a user to carry and keep track of two separate physical devices that furthermore are prone to becoming disconnected when jostled, bumped or subject to other movements.

Moreover, unlike conventional solutions that are limited to low power, low range, low bandwidth radios, the presently disclosed self-contained mesh radio unit is suitable for use in mission critical applications, providing high bandwidth secure/encrypted communications from short range up to intermediate or long ranges. Where conventional solutions provide bandwidth in the kilobits/s range, the presently disclosed self-contained mesh radio unit can achieve bandwidths that are multiple orders of magnitude greater, providing bandwidth in excess of several hundred megabits/s depending on environmental factors. Furthermore, in addition to augmenting communication reliability when moving in and out of cell coverage (whether provided by public carriers or private infrastructure), the presently disclosed self-contained mesh radio system is also fully capable of operating in austere communication environments where no cellular or primary communication network coverage exists. As will be described in greater depth below, the presently disclosed self-contained mesh radio system and units are able to mesh smartphone and user communication devices directly to one another in a dynamic, self-healing, closed L2 (layer 2) network when disconnected from a serving carrier or primary communication network.

The self-contained mesh radio unit and its associated meshed communication network augment the functionality of the primary communication network (e.g., LTE, 5G, etc.) relied upon by the communication device—where these primary communication networks depend heavily on both the availability and proximity of the communication device to centralized base stations, the meshed communication network does not: in the absence of primary network availability, the self-contained mesh radio unit and can perform automatic failover to the meshed communication network and thereby provide direct, peer-to-peer communications to other users and/or communication devices reachable through the meshed communication network.

For example, in some embodiments it is contemplated that the meshed communication network is formed wholly or partly of users having smartphones with the presently disclosed self-contained mesh radio unit coupled thereto. However, it is also contemplated that the self-contained mesh radio unit can operate independently of smartphones and other primary communication devices—rather than performing failover from a primary LTE or other communication network, the self-contained mesh radio unit can instead provide dedicated access to the meshed communication network to one or more laptops and other IP connectivity devices. This dedicated access for additional devices can be performed when the self-contained mesh radio unit is already coupled with a communication device (e.g., with a smartphone already installed in the receiving case portion of the mesh radio unit's housing) and/or can be performed in standalone fashion (without a smartphone or other communication device physically coupled to the housing of the mesh radio unit).

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 4A is a perspective rear view of an example self-contained mesh radio unit installed on a user communication device, with a rear housing panel of the self-contained mesh radio unit removed; and FIG. 4B is a perspective front view of an example self-contained mesh radio unit installed on a user communication device according to aspects of the present disclosure.

DETAILED DESCRIPTION

Figure 1A:
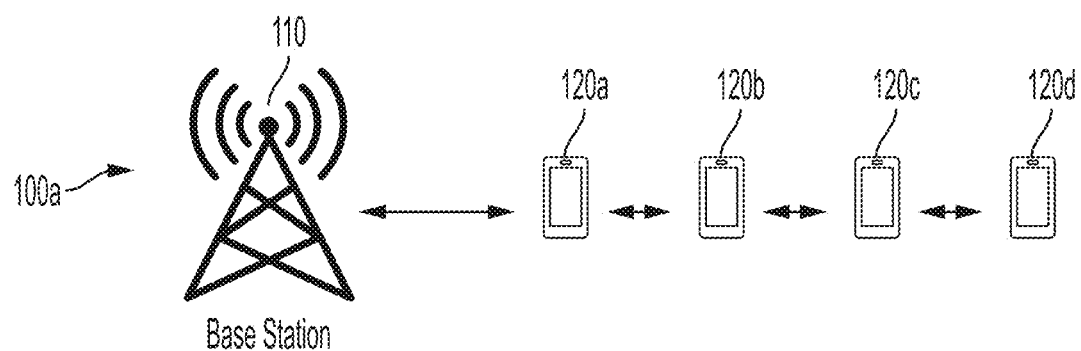
FIGS. 1A-C depict different example communication configurations of user communication devices coupled to self-contained mesh radio units according to aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. It will be appreciated that for simplicity and clarity of illustration, where appropriate, reference numerals have been repeated among the different figures to indicate corresponding or analogous elements. The description is not to be considered as limiting the scope of the embodiments described herein. Aspects of the disclosure may be embodied in many different forms and should not be construed as limited to the example embodiments set forth herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein.

Disclosed is a self-contained mesh radio unit for augmenting various communication devices to include automatic failover from a primary communication network of the communication device (e.g., cellular network, LTE, etc.) to a meshed communication network provided by the self-contained mesh radio unit. In some embodiments, the self-contained mesh radio unit can be integrated into a housing that also functions as a case or sleeve in which a smartphone or other primary communication device may be inserted, although it is appreciated that the self-contained mesh radio unit can also be used in a standalone fashion, as will be described in greater depth below.

The disclosure begins with a discussion of example scenarios and use cases demonstrating the capabilities of the presently disclosed self-contained mesh radio unit(s) and corresponding meshed communication network—these examples are discussed with respect to FIGS. 1A-2B. The disclosure turns next to a description of an example self-contained mesh radio unit, its architecture, and consistent components, as seen in FIG. 3. An example of the self-contained mesh radio unit coupled to a user communication device (here, a smartphone) is seen in FIGS. 4A and 4B.

Note that in the context of the following discussion and examples, reference is made to a scenario in which the primary communication device is provided by a cellular phone, smartphone, or other mobile communication device. However, it is appreciated that this is for purposes of example and clarity of illustration, and that various other communication devices and associated form factors can be utilized without departing from the scope of the present disclosure. Similarly, although reference is made to examples in which the primary communication network consists of a public or private LTE network, it is appreciated that various other cellular networks (2G, 3G, 4G, 5G, etc.), communication networks, and communication protocols may be employed without departing from the scope of the present disclosure.

Figure 1B:
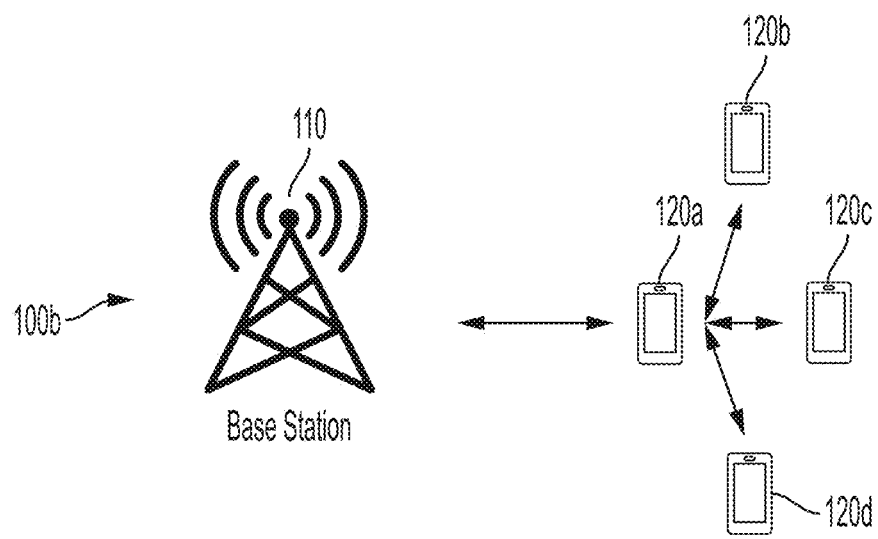
Figure 1C:
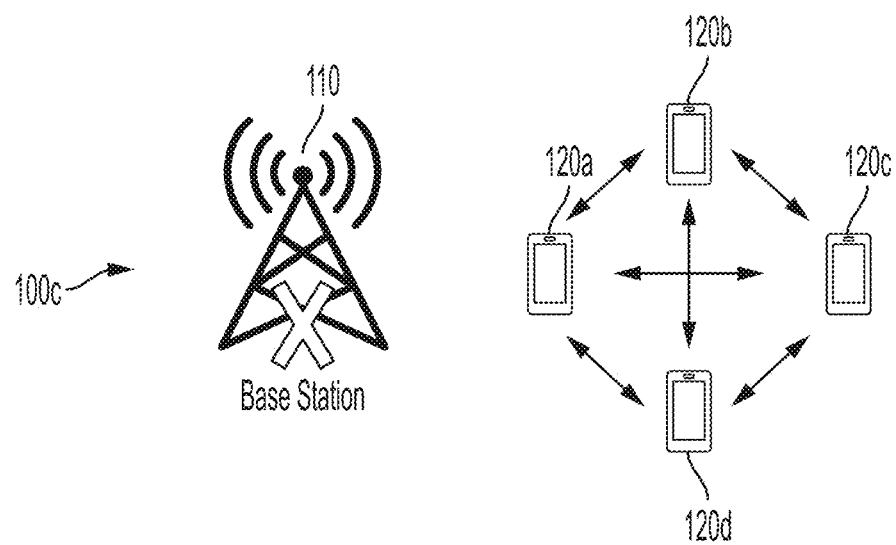

FIGS. 1A-C depict three different communication configurations 100a-c. Each will be discussed in turn below. The same components are depicted in each of the communication configurations: four user communication devices 120a-d and a base station 110. Base station 110 is associated with providing a primary communication network, such as an LTE or 5G network, over which the user communication devices 120a-d transmit and receive data and communications. The primary communication network can be public or private and can implement telecommunication standards other than LTE or 5G without departing from the scope of the present disclosure.

Each one of the user communication devices 120a-d is equipped with or coupled to one of the presently disclosed self-contained mesh radio units (not shown). For example, if the user communication devices are smartphones, then the self-contained mesh radio unit can be provided as a case into which the smartphone is inserted. Note that the failover of user communication devices 120a-d to the meshed network provided by the self-contained mesh radio units (i.e., occurring when the primary network provided by base station 110 is out of range, unreachable, providing insufficient signal strength, etc.) does not extend the LTE or other cellular coverage of base station 110, but instead provides a peer-to-peer IP connection between the user communication devices 120a-d and, optionally, the base station 110 (as will be explained in greater depth with respect to FIG. 3.)

Moreover, although each user communication device is shown as being identical, it is also possible for a heterogeneous group of user communication devices to be utilized. For example, a heterogeneous group might include different types or models of smartphones having different physical dimensions, operating system versions, and/or primary communication networks. A heterogeneous group might also include a first group of user communication devices that are directly coupled to the self-contained mesh radio unit (e.g., a smartphone inserted into a mesh radio case/sleeve) and a second group of user communication devices that are externally tethered to the self-contained mesh radio unit (e.g., a laptop connected via an Ethernet cable).

As will be discussed in greater depth with respect to FIG. 3, it is contemplated that the presently disclosed mesh radio unit can run its own NAT (Network Address Translation) router and DHCP (Dynamic Host Configuration Protocol) server. Accordingly, in some embodiments, a single self-contained mesh radio unit can provide simultaneous mesh network and IP connectivity to multiple different user communication devices. For example, a single mesh radio unit can simultaneously connect two different communication devices to the meshed communication network: a smartphone can be inserted into the sleeve/case portion of the mesh radio unit, while a laptop or other IP-capable device is connected to the WAN port (Ethernet, etc.) of the mesh radio unit. In some embodiments, the self-contained mesh radio unit can be configured with an Ethernet switch in order to provide a single, consolidated access point for connecting multiple different computers and other IP devices to the meshed communication network. An Ethernet switch can be connected to an Ethernet or other WAN port of the mesh radio unit; can be integrally provided as a component of the self-contained mesh radio unit itself; or some combination of the two. Because the presently disclosed self-contained mesh radio unit provides IP connectivity over the mesh network, it is appreciated that various different IP connection standards and networking technologies can be utilized with the self-contained mesh radio unit within the context of the present disclosure.

FIG. 1A depicts an example communication configuration 100a in which user communication devices 120a-d are arranged in a network topology having only a single routing path connecting all of the devices. Such an arrangement can arise out of simplicity, or more commonly, necessity, such as when the user communication devices are all sufficiently far apart such that they are only able to establish mesh radio communications with immediately adjacent devices (e.g., device 120d can directly reach device 120c over mesh radio but cannot directly reach device 120b). As shown here, the distance between devices is 2 kilometers, although it is appreciated that this is for purposes of illustration and is not intended to be construed as limiting—although maximum communication ranges are heavily environment-dependent, in some embodiments the presently disclosed self-contained mesh radio units can nevertheless be configured to provide maximum ranges that exceed 2 kilometers. FIG. 1B depicts an example communication configuration 100b in which user communication devices 120b-d are all connected to user communication device 120a, but not to each other, illustrating a one-to-many topology as compared to the one-to-one topology of FIG. 1A.

Regardless of the distances between various pairs of communication devices, connection to a single device currently participating in the meshed network provides connection to all of the devices currently participating in the meshed network, by virtue of the design and functionality of the mesh network. For example, in the context of FIG. 1A, although user device 120d is only able to communicate directly with user device 120c, user device 120c can forward traffic from device 120d onward to user device 120b (which can then forward onward to user device 120a, and so on as needed until the correct destination is reached). In the context of FIG. 1B, all traffic runs through user device 120a, due to its centralized position within the meshed communication network.

In some embodiments, one or more base stations of the primary communication network can be configured for inclusion in the meshed communication network. For example, in both FIGS. 1A and 1B, a bidirectional communication link is depicted between user device 120a and base station 110, thereby allowing all other devices on the mesh network to reach base station 110 by routing through user device 120a. Although not depicted, base station 110 can be equipped with a mesh radio hardware that allows base station 110 to transmit and receive on the same frequency or frequencies as the self-contained mesh radio units 120a-d—noting that the meshed communication network and the primary communication network typically implement entirely separate frequency bands and/or transmission protocols. In some embodiments, one of the presently disclosed self-contained mesh radio units can be communicatively coupled to base station 110, e.g., via an Ethernet or WAN connector on the self-contained mesh radio unit rather than configuring the base station 110 with different mesh radios and/or mesh hardware.

Note, however, that because of the direct, peer-to-peer nature of the meshed communication network, in many instances it may not be necessary for the user devices 120a-d to route communications back to base station 110, unless base station 110 itself is an intended or desired recipient. In a conventional cellular network scheme, communications and data are not exchanged directly between user devices but are instead intermediated by several network infrastructure components, including base stations. That is, for user device 120a to communicate with user device 120b over the primary communication network associated with base station 110, the communication path runs from user device 120a—base station 110—user device 120b.

In contrast, when the user devices 120a-d failover to their self-contained mesh radio units and participate in the meshed communication network, the user devices 120a-d can operate independently as a peer-to-peer network without requiring any participation by base station 110. For example, FIG. 1C illustrates one such scenario in which the user devices 120a-d form a peer-to-peer direct communication network 100c via the mesh radio units attached to each user device. Note that as illustrated, the peer-to-peer network 100c is shown as fully connected. In some embodiments, the presently contemplated peer-to-peer networks and various other configurations of the meshed communication network will not be fully connected—although the meshed network can seek to establish as many connections as possible or available, it is noted again that any given communication device is able to participate in the meshed communication network with just a single link. In many scenarios in which user devices 120a-d failover to the self-contained mesh radio units, the user devices 120a-d most commonly might be used to communicate with one another rather than a base station (e.g., an emergency response team wants to continue using their smartphones for communication, but cellular service is down).

However, there are also scenarios in which user devices 120a-d can be expected to use the meshed network to exchange communications and/or data with base station 110. For example, this might occur when base station 110 is considered not as a simple fixed cellular tower, but rather as portable communications node that can be deployed in conjunction with a hierarchical command structure, i.e., in which the users of devices 120a-d report to the command associated with base station 110. (See, for example, the multi-modal communication unit of commonly owned U.S. patent application Ser. No. 17/092,548, the disclosure of which is hereby incorporated by reference). Therefore, the ability to use the meshed communication network to reach base station 110 can be particularly helpful in the contexts in which the presently disclosed self-contained mesh radio units might be utilized, i.e., when the primary communication network associated with base station 110 is out of range, unreachable, providing insufficient signal strength, etc.

In some embodiments, one or more of the self-contained mesh radio units can be utilized as dedicated relay devices and be positioned to extend, maximize, and/or optimize the range and coverage of the overall meshed communication network. When functioning as a relay device, the self-contained mesh radio unit may still be coupled to a user communication device (e.g., a smartphone is inserted in the mesh radio sleeve) or the self-contained mesh radio unit can operate independently, without being couple to any user communication device.

Figure 2A:
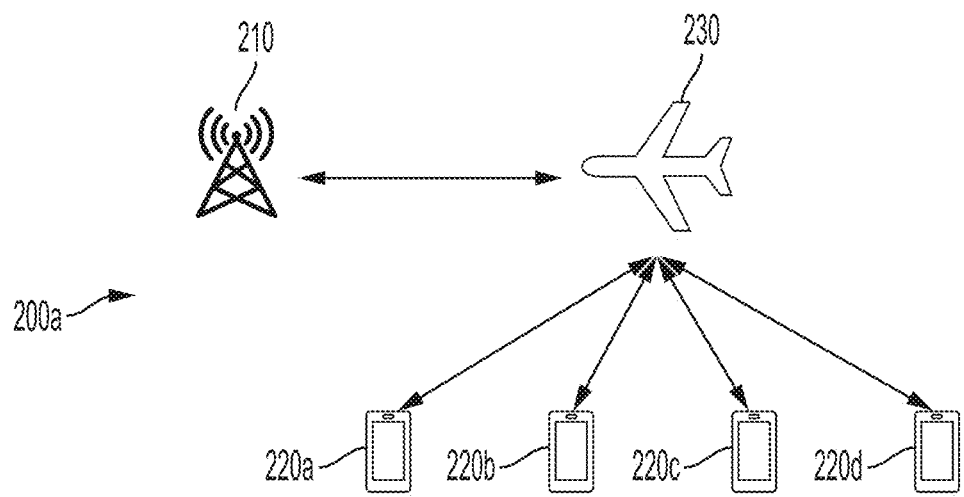
FIGS. 2A-B depict example communication configurations of user communication devices and UAVs (Unmanned Aerial Vehicles) each coupled to self-contained mesh radio units according to aspects of the present disclosure.
Figure 2B:
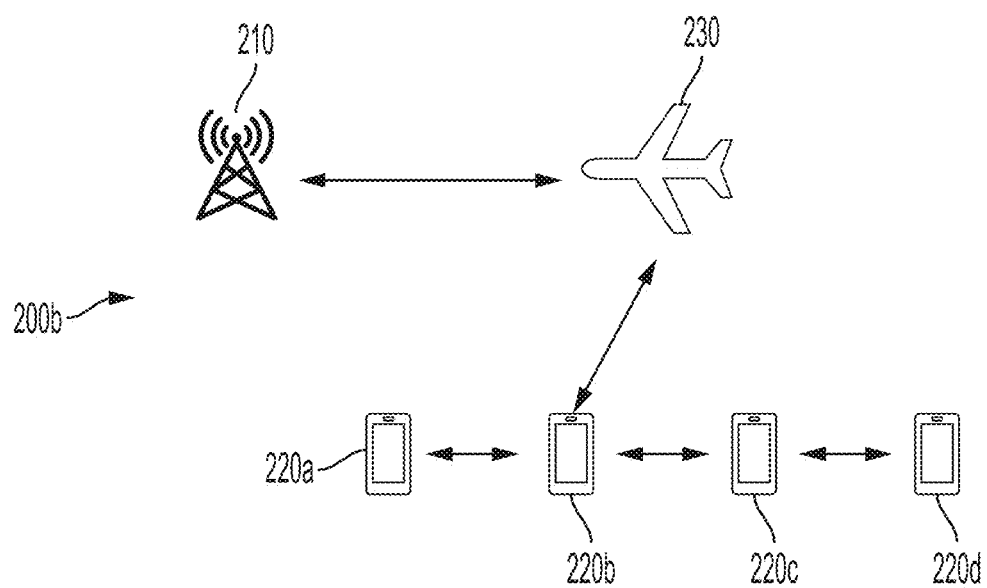
Figure 3:
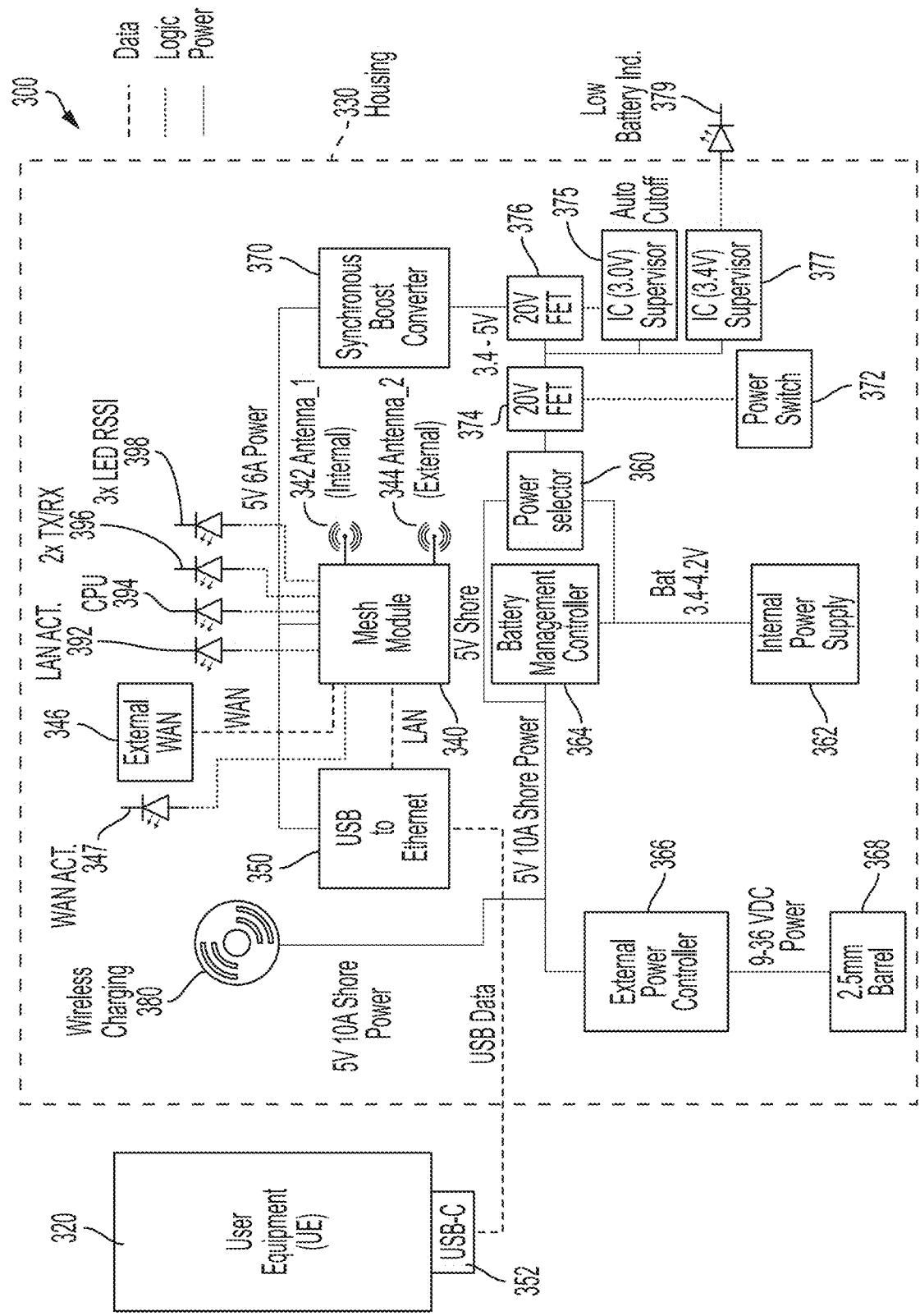
FIG. 3 is an example architecture diagram illustrating constituent components of an example self-contained mesh radio unit according to aspects of the present disclosure.

In some embodiments, the self-contained mesh radio unit can be integrated with, attached to, or carried by a movable vehicle such as a UAV (Unmanned Aerial Vehicle), as illustrated in FIGS. 2A-B. Both Figures depict an example UAV 230 that is equipped with at least one of the presently disclosed self-contained mesh radio units in order to communicate with one or more of the user communication devices 220a-d via the meshed communication network (as opposed to the primary cellular communication network associated with base station 210). However, it is appreciated that other vehicles and transportation modes, both autonomous and manned, aerial and terrestrial, can be utilized to provide a relay or repeater functionality with a self-contained mesh radio unit.

More particularly, FIG. 2A illustrates an example communication configuration 200a in which UAV 230 extends the range of user device to user device proximity by relaying communications between the various communication devices 220a-d. This relay functionality is made possible by the fact that UAV 230 is within mesh radio range of each of the communication devices 220a-d. By contrast, FIG. 2B illustrates an example communication configuration 200b in which UAV 230 is only able to communicate directly with a single user device 220b (i.e., user devices 220a, 200c, and 220d are all beyond mesh radio range of UAV 230). In this scenario, the remaining user devices 220a,c,d are still able to reach UAV 230, albeit with multi-hop links passing through user communication device 220b. In both scenarios, UAV 230 can also extend the range at which the user communication devices 220a-d are able to communicate back to base station 210 when it is so desired (as was discussed previously with respect to FIGS. 1A-C).

In some embodiments, one or more of the self-contained mesh radio units associated with the user devices 220a-d and/or UAV 230 can automatically select the shortest or optimal path to a requested IP destination based on mesh agility and/or required transmission characteristics. For example, referring to FIG. 2B, consider a scenario in which an unreliable or low-bandwidth mesh radio connection might also exist between user device 220c and UAV 230. Because this connection is of low quality, when user device 220c generates an IP data packet addressed to UAV 230 as its destination, the low-quality direct connection will not be selected so long as user device 220c's self-contained mesh radio unit is able to determine that a higher quality alternative connection is available to UAV 230. Here, the alternative connection is through user device 220b, and accordingly, the self-contained mesh radio unit coupled to user device 220c will automatically determine that the IP packet should be routed from user device 220c—user device 220b—UAV 230.

In some embodiments, multiple UAVs 230 can be utilized to extend the meshed communication network's interconnection of user communication devices even further. For example, FIGS. 2A and 2B depict different configuration scenarios by which UAV 230 can communicate with a first group of user devices 220a-d that are within relatively close proximity to UAV 230. However, UAV 230 can also communicate with a second UAV, associated with its own second group of user devices, that are located well beyond the range of any direct radio communications between the first group of user devices and the second group of user devices. Taking advantage of the improved sightlines and transmission ranges available at altitude (i.e., UAVs can fly above or around terrain and other ground-based obstacles), UAV 230 can use its mesh radio to extend the mesh communication network to include other UAVs and user communication devices that are significantly distant from UAV 230 and its associated user devices 220a-d. Additionally, in some embodiments one or more of the UAVs (including UAV 230) can be configured with a mesh radio module with greater transmission power/range than that of the individual mesh radio units coupled to the user communication devices 220a-d.

The disclosure turns now to FIG. 3, which is a block diagram illustrating an example internal architecture of a self-contained mesh radio unit 300. For reference, FIGS. 4A and 4B present perspective views of a smartphone installed into a receiving sleeve of an example self-contained mesh radio unit of the present disclosure.

The self-contained mesh radio unit 300 includes a housing 330, which contains the various constituent components of the mesh radio and additionally provides a receptacle (also referred to herein as a "receiving portion") into which a user communication device or user equipment (UE) 320 can be inserted and physically coupled to the housing 330. However, it is noted that the user communication device 320 is not a component of self-contained mesh radio unit itself 300; rather, self-contained mesh radio unit 300 is adapted for compatibility and/or interoperability with various different user communication devices 320. In some embodiments, particularly when the user communication device is provided as a smartphone or other handheld communication device, housing 330 can take the form of a sleeve or case that envelops the smartphone, and as such the terms "sleeve" and "case" are used herein to refer to housing 330. (For example, FIG. 4B provides a perspective view showing a user communication device 420, in the form of a smartphone, that has been physically coupled to a housing 430, in the form of a sleeve or case designed to receive the inserted user device, of a self-contained mesh radio unit).

As illustrated, the majority of the components of the self-contained mesh radio unit 300 are contained within an interior volume defined by housing 330 and are generally positioned such that, in normal handheld operation, they are located beneath the inserted user communication device 320. However, it is appreciated that the constituent components of self-contained mesh radio unit 300 can be rearranged or otherwise located in different relative positions within housing 330, all without departing from the scope of the present disclosure.

In order to provide UE 320 with automatic failover from its primary communication network (e.g., LTE) to the meshed communication network, self-contained mesh radio unit 300 utilizes a data connection with UE 320, via a data connector 352. Data connector 352 can be provided on the exterior of housing 330, such that the insertion of UE 320 into the sleeve or case portion of the housing causes data a corresponding port on UE 320 to be brought into electrical or communicative connection with data connector 352. For example, as illustrated, data connector 352 is a USB-C connector, although it is appreciated that various other connector types and terminal hardware capable of providing at least data (and optionally delivering charge) can be utilized without departing from the scope of the present disclosure.

Data connector 352 provides a bi-directional link between UE 320 and self-contained mesh radio unit 300. In normal operation of UE 320, a primary communication network such as LTE is used to transmit and receive—self-contained mesh radio unit 300 performs background monitoring of the connection quality between UE 320 and the primary LTE network, e.g., via data transmitted through data connector 352. In some embodiments, network and/or signal state information can be transmitted from UE 320 to a mesh module 340 of the self-contained mesh radio unit 300, such mesh module 340 analyzes the received information itself and determines when to initiate a failover to the meshed radio network. In some embodiments, this failover determination can be made onboard UE 320, with only a failover trigger transmitted to mesh module 340 in response.

When a failover to the meshed network is initiated, packets that UE 320 would otherwise have transmitted via its onboard cellular antenna must instead be routed over USB and via data connector 352 to mesh module 340. However, if mesh module 340 does not have a USB input, then an adapter 350 (shown here as a USB-to-Ethernet adapter) is needed in order to permit UE 320 to send and receive via USB and mesh module 340 to send and receive via Ethernet. When other protocols are employed by UE 320 and/or mesh module 340, it is appreciated that adapter 350 can be configured to provide the desired data protocol to both UE 320 and to mesh module 340.

In some embodiments, mesh module 340 can comprise a digital data link (DDL) having one or more mesh radio transceivers. The digital data link provides interoperability between UE 320 and the mesh, receiving/transmitting IP packets to/from UE 320 over the meshed communications network in a seamless fashion. To provide this receiving and transmitting functionality, an internal antenna 342 and an external antenna 344 are provided, although it is appreciated that other antenna quantities and configurations can be utilized. In some embodiments, internal antenna 342 is a low gain antenna, and can be a PCB (Printed Circuit Board) trace antenna. In some embodiments, internal antenna 342 can be provided as an internal crosshair or fractal antenna. External antenna 344 can comprise a high gain whip antenna, although it is contemplated that self-contained mesh radio unit 300 can include (i.e., on housing 330) an SMA connector capable of receiving various external SMA antennae as desired.

The ability to quickly change from one antenna to another can be beneficial when a user needs to perform a frequency change on self-contained mesh radio unit 300, i.e., in order for the user to switch to a meshed communication network having a different frequency. Mesh module/DDL 340 is associated with a particular frequency or frequency range over which it can operate, and one or both of internal antenna 342 and external antenna 344 will typically be matched to the mesh module/DDL frequency. For example, in some embodiments, mesh module/DDL 340 can be configured to operate at a frequency of 0.9, 1.6, 2.3, 2.4, 2.5, or 5.8 GHz. In order to support changing between different mesh frequencies, mesh module 340 can be integrated with self-contained mesh radio unit 300 in a modular fashion that permits quick swaps between mesh modules of different frequencies. As seen in FIG. 4A, a quick-change connector 442 can be used to hold and receive various different mesh modules 340, wherein a user simply removes a protective cover on the back of housing 330 in order to access quick-change connector 442 and the mesh module 340 installed into quick-change connector 442. In some embodiments, quick-change connector 442 can comprise an IC (integrated circuit) carrier, such as the 80-pin IC carrier that is depicted in FIG. 4A.

The power system of self-contained mesh radio unit 300 is based on a combination of an internal, rechargeable battery (indicated as internal power supply 362) and an external power interface. The external power interface can consist of an external power control/transformer 366 and a DC input connector 368. In some embodiments, and as illustrated, the external power interface can additionally include wireless charging hardware 380, which for example can be provided as a wireless inductive charger coil integrated into housing 330. The internal rechargeable battery 362 can in some embodiments be provided as a lithium ion or lithium polymer battery with a nominal voltage between 3 and 5 volts, although of course other battery chemistries and voltages can be utilized without departing from the scope of the present disclosure. External power controller/transformer 366 can receive as input 9-36 VDC and provide an output of 5 VDC, or some other output voltage adjusted to match the nominal output voltage range that is provided by the internal battery 362.

Internal battery 362 is coupled to a battery management controller 364, which regulates the charge and discharge of internal battery 362. To charge internal battery 362, DC power is obtained from the external power interface, i.e., through the combination of DC input 368 and transformer 366, or from the wireless charging coil 380. A power selector 360 configures either the external power interface or the internal battery as the source of electrical power that is to be delivered to the various components of self-contained mesh radio unit 300 and permits the external power interface to be used simultaneously for charging internal power supply 362 and for powering the constituent components of self-contained mesh radio unit 300. When the internal battery 362 is selected for powering self-contained mesh radio unit 300, a synchronous boost converter 370 regulates the output voltage of the internal battery 362 and provides a constant 5 VDC output to the constituent components of self-contained mesh radio unit 300. As the state of discharge of the internal battery progresses, synchronous boost converter 370 monitors the battery voltage and triggers an alert or other indication when the battery voltage drops below a pre-determined threshold. In the context of the present example, synchronous boost converter 370 can trigger this low voltage warning (which serves as a low battery warning) when the output voltage of internal battery 362 drops below 3.4 volts.

In some embodiments, self-contained mesh radio unit 300 can additionally charge the UE/user communication device 320 that is connected to the self-contained mesh radio unit 300 via connector 352, given that the connector 352 supports power delivery in addition to data transmission, as is the case with the USB-C connector that is shown. In this manner, self-contained mesh radio unit 300 is more fully integrated with a user's connected communication device 320, minimizing the need or desire to disconnect from the self-contained mesh radio unit 300, and therefore, minimizing the likelihood that a user will disconnect from the meshed communication network.

Self-contained mesh radio unit 300 can additionally include one or more external WAN (wide area network) connectors 346, which permit various peripheral and IP-enabled devices such as laptops to be connected to self-contained mesh radio unit 300 and therefore the meshed communication network. In order to do so, WAN connector 346 communicatively couples an attached IP-enabled device to mesh module 340, and mesh module 340 provides the IP-enabled WAN device with access to the meshed communication network in much the same fashion as described above with respect to mesh module 340 and UE 320. In some embodiments, WAN connector 346 can be utilized while UE 320 is also connected to mesh module 340, such that mesh module 340 simultaneously connects UE 320 and an IP-enabled device at WAN connector 346 to the meshed communication network. Additionally, as mentioned previously an Ethernet switch can be connected to WAN connector 346 in order to permit multiple IP-enabled devices to be connected to the meshed communication network through mesh module 340. In some embodiments, an Ethernet switch can be integrated in self-contained mesh radio unit 300, such that multiple IP-enabled devices can be connected to and served by mesh module 340 without requiring any external or additional switching gear.

FIG. 4A depicts a cutaway view of a self-contained mesh radio unit 400 as installed on the rear face of a user communication device 420 (shown here as a smartphone). Not seen in FIG. 4A is the entirety of housing 430 that would contain the internal circuitry and components of the mesh radio unit 400. FIG. 4B shows a front view of the same mesh radio unit 400 and communication device 420 combination, without the back portion/panel of housing 430 removed.

Returning to FIG. 4A, a quick-change connector 442 permits the quick swapping of various modular DDLs or other mesh modules of specified frequencies. A pair of power connectors 480 and 462 provide power to the board—connector 480 couples to a wireless charging apparatus (i.e., an inductive charging coil) and connector 462 couples to the rechargeable internal battery (not visible, installed inside of the mesh radio unit housing between the circuit board 450 and the user communication device 420). An external power connector 468 receives DC power for recharging the internal battery of the self-contained mesh radio unit 400, powering the self-contained mesh radio unit 400, and/or charging attached user communication device 420. As illustrated, external power connector 468 comprises a 2.5 mm barrel plug connector, although various other connectors may also be employed. For example, in some embodiments external power connector 468 can be the same type as connector 352, which is compatible with the charging/data port of the user communication device 420. External WAN connector 446 is shown here as a JST 5-pin connector, although it is appreciated that various other connector types can be used to provide peripheral WAN access to self-contained mesh radio unit 400 and the associated meshed communication network. In some embodiments, a flexible PCB portion 454 can be used to couple the smartphone connector 452 to the rest of the circuit board 450 that is contained within the housing of self-contained mesh radio unit 400. The use of flexible PCB portion 454 reduces or eliminates stress that would otherwise be applied to connector 452 while it is connected to the user communication device 420, i.e., stresses that would arise due to the tight confines of the internal volume of housing 430 and the vertical offset between the location of connector 452 and the main board 450 of the self-contained mesh radio unit 400.

What is claimed is:

1. A mesh radio extension unit comprising:
    a receiving sleeve, wherein the receiving sleeve includes an open volume and at least a first data connector, the first data connector providing a communicative coupling to a communication device inserted in the open volume of the receiving sleeve;
    a low-gain internal antenna;
    a high-gain external antenna;
    a digital data link (DDL) associated with a first DDL operating frequency and coupled to one or more of the internal antenna and the external antenna, such that the DDL provides bidirectional data connectivity between the first data connector and a peer-to-peer meshed communication network by controlling one or more of the internal antenna and the external antenna as a transceiver at the first DDL operating frequency;
    a power supply system controllable to provide electrical power to at least the DDL, the power supply system including a battery and a power interface; and
    a control system for automatically routing one or more data packets received or transmitted by the DDL, wherein the control system includes a network address translation (NAT) router and an addressing service for assigning and tracking addresses across the peer-to-peer meshed communication network,
    and wherein the control system causes the communication device communicatively coupled to the first data connector to failover to the peer-to-peer meshed communication network in response to determining that a primary network associated with the communication device is unavailable or has a signal strength below a pre-determined threshold.

2. The mesh radio extension unit of claim 1, wherein the control system configures the first data connector as an Ethernet over USB (Universal Serial Bus) source.

3. The mesh radio extension unit of claim 1, wherein the first data connector is a USB-C connector and the mesh radio extension unit further comprises a USB to Ethernet adapter communicatively coupled between the first data connector and the DDL.

4. The mesh radio extension unit of claim 1, wherein the DDL:
- receives a data packet from the communication device coupled via the first data connector, the data packet destination address corresponding to a second communication device participating in the peer-to-peer communication network; and
- transmits the data packet, over the peer-to-peer communication network, to a second mesh radio extension unit determined to be communicatively coupled to the second communication device identified by a destination address of the data packet.

5. The mesh radio extension unit of claim 1, further comprising an external wide access network (WAN) peripheral port, the WAN peripheral port communicatively coupled to the DDL in order to provide access between the peer-to-peer meshed communication network and one or more IP-enabled communication devices connected to the WAN peripheral port.

6. The mesh radio extension unit of claim 5, wherein the WAN peripheral port is an Ethernet port.

7. The mesh radio extension unit of claim 5, wherein the WAN peripheral port comprises an Ethernet switch for connecting multiple IP-enabled communication devices to the peer-to-peer meshed communication network via the DDL.

8. The mesh radio extension unit of claim 1, wherein the internal antenna comprises one or more of a printed circuit board (PCB) antenna, an internal crosshair antenna, or a fractal antenna.

9. The mesh radio extension unit of claim 1, wherein the external antenna is a high-gain whip antenna.

10. The mesh radio extension unit of claim 1, wherein the external antenna is an SMA antenna and the mesh radio extension unit further comprises an SMA connector for communicatively coupling the external antenna to the DDL.

11. The mesh radio extension unit of claim 1, wherein the integrated power supply system provides charging power to the first data connector in order to charge a connected device, the charging power obtained from the internal battery or the external power interface.

12. The mesh radio extension unit of claim 1, wherein the integrated power supply obtains electrical power from the external power interface and regulates charging of the internal battery.

13. The mesh radio extension unit of claim 1, wherein the external power interface comprises a connector for receiving DC electricity.

14. The mesh radio extension unit of claim 13, wherein the external power interface further comprises a wireless charging antenna disposed inside a housing of the mesh radio extension unit.

15. The mesh radio extension unit of claim 1, wherein the first DDL operating frequency is different from a carrier frequency over which the coupled communication device operates.

16. The mesh radio extension unit of claim 15, wherein the first DDL operating frequency is 0.9, 1.6, 2.3, 2.4, 2.5 or 5.8 gigahertz (GHz).

17. The mesh radio extension unit of claim 15, wherein the coupled communication device is a smartphone, and the carrier frequency is a 4G, LTE (Long Term Evolution), or 5G cellular telecommunication frequency band.

18. The mesh radio extension unit of claim 1, wherein the control system further comprises a DHCP (Dynamic Host Configuration Protocol) server for automatic IP addressing over the peer-to-peer meshed communication network.

19. The mesh radio extension unit of claim 1, wherein the control system performs a mesh agility analysis for transmitting a given IP packet to a given IP destination and causes the DDL to transmit the given IP packet via a best path through the peer-to-peer meshed communication network to the given IP destination.

* * * * *